(12) United States Patent
Guyot et al.

(10) Patent No.: US 8,818,262 B2
(45) Date of Patent: Aug. 26, 2014

(54) WIRELESS IDENTIFICATION AND RESEARCH NETWORK FOR SPACE DEVICES

(75) Inventors: Philippe Guyot, Le Tignet (FR); Christian Bainier, Le Cannet (FR)

(73) Assignee: Thales, Neuilly sur Seine (FR)

( * ) Notice: Subject to any disclaimer, the term of this patent is extended or adjusted under 35 U.S.C. 154(b) by 194 days.

(21) Appl. No.: 13/319,448

(22) PCT Filed: Apr. 30, 2010

(86) PCT No.: PCT/EP2010/055926
§ 371 (c)(1),
(2), (4) Date: Nov. 8, 2011

(87) PCT Pub. No.: WO2010/139513
PCT Pub. Date: Dec. 9, 2010

(65) Prior Publication Data
US 2012/0052797 A1    Mar. 1, 2012

(30) Foreign Application Priority Data

Jun. 5, 2009 (FR) ...................................... 09 02730

(51) Int. Cl.
*H04W 84/06* (2009.01)
*H04B 7/185* (2006.01)

(52) U.S. Cl.
CPC .......... *H04B 7/18517* (2013.01); *H04W 84/06* (2013.01)
USPC ....................................................... 455/12.1

(58) Field of Classification Search
None
See application file for complete search history.

(56) References Cited

U.S. PATENT DOCUMENTS

2007/0049195 A1    3/2007  Chun
2010/0235696 A1*   9/2010  Emam et al. ................. 714/727

FOREIGN PATENT DOCUMENTS

EP    1032142 A2    8/2000
WO    2009/001122 A1    12/2008

OTHER PUBLICATIONS

Satish Sharma et al.: "Wireless Telecommand and Telemetry System for Satellite," Recent Advances in Space Technologies, 2007. RAST '07. 3rd International Conference On, IEEE, PI, Jun. 1, 2007, pp. 551-555.
Vladimirova T. et al.: "Characterising Wireless Sensor Motes for Space Applications," Adaptive Hardware and Systems, 2007. AHS 2007. Second NASA/ESA Conference on, IEEE, Piscataway, NJ, USA, Aug. 5, 2007, pp. 43-50.

* cited by examiner

*Primary Examiner* — Philip Sobutka
(74) *Attorney, Agent, or Firm* — Baker Hostetler LLP

(57) ABSTRACT

An evanescent wireless network system for space equipment items integrated, or intended to be integrated, in a satellite, and including a set of smart couplers, integrated or not with said space equipment items, said smart couplers including wireless communication means, forming an embedded wireless network; and a computer configured for wireless communication, which can be connected to said embedded wireless network, and including software enabling access to the embedded wireless network, in order to at least collect information relating to the operation of said space equipment items in a non-intrusive manner.

12 Claims, 3 Drawing Sheets

WIRELESS IDENTIFICATION AND RESEARCH NETWORK FOR SPACE DEVICES

CROSS-REFERENCE TO RELATED APPLICATIONS

This application is a National Stage of International patent application PCT/EP2010/055926, filed on Apr. 30, 2010, which claims priority to foreign French patent application No. FR 09 02730, filed on Jun. 5, 2009, the disclosures of each of which are incorporated by reference in their entireties.

FIELD OF THE DISCLOSED SUBJECT MATTER

The present invention relates to the observability of equipment items intended to be integrated in satellites.

The object of the invention is to propose a simple and robust technical solution to the problem of the observability of equipment items intended to be integrated in satellites. By virtue of the invention, this observability is made possible throughout the life cycle of the equipment items, from their manufacture through to their implementation in space.

The invention is particularly well suited to an application in the field of satellite constellations, because it makes it possible to simplify and rationalize the processing of the data, mainly in the assembly and testing phases.

BACKGROUND

Generally, when an anomaly is detected on an equipment item, the procedure to be followed comprises two main steps:
  access to information concerning what the equipment item affected by the anomaly "saw" at the moment when the anomaly was declared;
  application of a program of tests in order to understand the causes of the anomaly observed.

The known means for trying to successfully conduct these investigation steps lack flexibility; furthermore, they are difficult to implement and costly. Moreover, they generally entail dismantling assembled equipment items or introducing devices into the overall system including the equipment item affected by the anomaly. Such interventions, often time-consuming, also require consents, which can potentially take a long time to obtain, allowing the intervention.

In practice, these days, when investigations are carried out, on a satellite that is at least partially assembled, in order to determine the causes of an anomaly occurring on an equipment item, it is necessary to communicate with the equipment item or items concerned, inside the satellite, from "ground" communication means, via:
  electrical interfaces of the equipment item or items concerned, in nominal mode, called driven mode;
  means for radiofrequency communication, by uplinks and downlinks, generally in the S band or in the Ku band, in nominal mode, called RF (radiofrequency) mode;
  appliances, or "exploded boxes", that make it possible to sample and analyze an analog signal at any point of the equipment item, in anomaly mode.

Moreover, digital signals can, subject to certain conditions, be sampled and analyzed using sensors based on the principle of a Hertzien loop.

The complexity, lack of flexibility, the lead times required for a complete investigation, and the costs of these known means used to search for the causes of an anomaly detected on an equipment item are incompatible with the "real time" nature and the objectives of simplicity, robustness and discretion desired for such applications: they therefore constitute as many defects as the present invention seeks to resolve.

SUMMARY

The present invention is consequently based on the idea of associating, from their design, with the equipment items intended to be integrated in a satellite, smart couplers provided with wireless communication means. An embedded wireless network is thus formed and made accessible and controllable from a laptop computer when the satellite is on the ground in the integration or test phase. When the satellite is in flight, the embedded wireless network is nominally deactivated. This or these smart coupler(s) also have an internal memory enabling them to store technical information relating to the equipment item or to the equipment items with which they are associated. The internal memory of these smart couplers can be consulted in real time or offline, facilitating non-intrusive investigations in case of anomaly. Moreover, the internal memory of the couplers also contains self-test functions for the equipment items, which can be executed remotely.

Thus, the subject of the invention is an open-ended and evanescent wireless network system for space equipment items integrated, or intended to be integrated, in a satellite, comprising:
  a set of smart couplers integrated with said space equipment items from the time of their manufacture or used independently within a satellite, said smart couplers including internal and external wireless communication blocks, forming an open-ended wireless network, forming, on the ground, in each space equipment item, a so-called "distributed" network, then a so-called "embedded" network after final integration of the satellite,
  at least one computer, which may be a laptop computer, equipped with a wireless communication card, which can be connected to said open-ended wireless network,
  at least one software program installed on said computer, enabling
    isolated access to any space equipment item, in order to at least collect information relating to the correct operation of said space equipment item,
    access to the embedded wireless network, in order to at least collect information relating to the operation of said space equipment items, in a non-intrusive manner.

In the system according to the invention, the smart couplers comprise a processor, an internal memory, a transmission/reception circuit and at least one high-frequency antenna, said internal memory of said smart couplers also comprising means for handling, through suitable programming, at least one of the following functions:
  automatically saving parameters relating to the operation of the space equipment items with which they are associated,
  storing technical data relating to the space equipment items with which said smart couplers are associated,
  storing self-test procedures, relating to the space equipment items with which said smart couplers are associated, which can be executed remotely.

In the system according to the invention, advantageously, said satellite including nominal ground/onboard communication means and said satellite being in flight, the embedded wireless network can be configured to communicate with the computer situated on the ground notably via the nominal communication means of the satellite.

In the system according to the invention, said embedded wireless network includes means for electrically activating and deactivating it.

In the system according to the invention, said embedded wireless network includes means for remotely activating and deactivating it, said space equipment items being on the ground within a satellite, for example in the test phase.

In the system according to the invention, said embedded wireless network includes means for remotely activating and deactivating it, said space equipment items being in flight within a satellite in orbit.

Advantageously, the system according to the invention comprises means for handling at least one of the following functions:
- assisting in determining the state of each of said space equipment items,
- updating, each of said space equipment items presenting an acceptance test report, said acceptance test reports,
- acquiring and recording failures, alarms or events occurring on said space equipment items,
- launching self-test procedures remotely on said space equipment items,
- reading technical data relating to said space equipment items,
- reading parameters relating to said space equipment items, recorded automatically,
- acquiring in real time parameters over one or more data buses associated with said space equipment items,
- providing diagnostic assistance in case of malfunction of one of the space equipment items on the ground,
- providing diagnostic assistance in case of malfunction of one of the space equipment items in flight.

Advantageously, the embedded wireless network exhibits a topology comprising internal nodes corresponding to the internal wireless communication blocks, and interface nodes, corresponding to the external wireless communication blocks, said internal nodes and said interface nodes consequently being associated with the internal and external smart couplers, and said interface nodes enabling communication between said internal nodes and at least one external node, fixed or mobile relative to said internal nodes, said external node corresponding to said computer, which may be a laptop computer.

The embedded wireless network according to the invention may include means for handling the operational data bus function.

The embedded wireless network according to the invention may have a mode of operation in which the embedded wireless network constitutes an evanescent data bus which cannot be activated in flight.

The embedded wireless network according to the invention may have a mode of operation in which the embedded wireless network constitutes an operational data bus, necessary to the operation of the satellite or redundant.

The embedded wireless network according to the invention may have a mode of operation in which the embedded wireless network constitutes an evanescent data bus including means for activating it in flight for diagnostic assistance purposes, notably in case of malfunction of one of the space equipment items.

The embedded wireless network according to the invention may have a mode of operation in which the embedded wireless network constitutes a real data bus, necessary to the operation of the satellite or redundant.

The embedded wireless network according to the invention may have a mode of operation in which the embedded wireless network constitutes an evanescent data bus including means for activating it in flight for diagnostic assistance purposes in case of malfunction of one of the space equipment items.

BRIEF DESCRIPTION OF THE DRAWINGS

Other features and advantages of the invention will become apparent from the following description, given in light of the appended drawings which represent.

DETAILED DESCRIPTION

Figure 1:
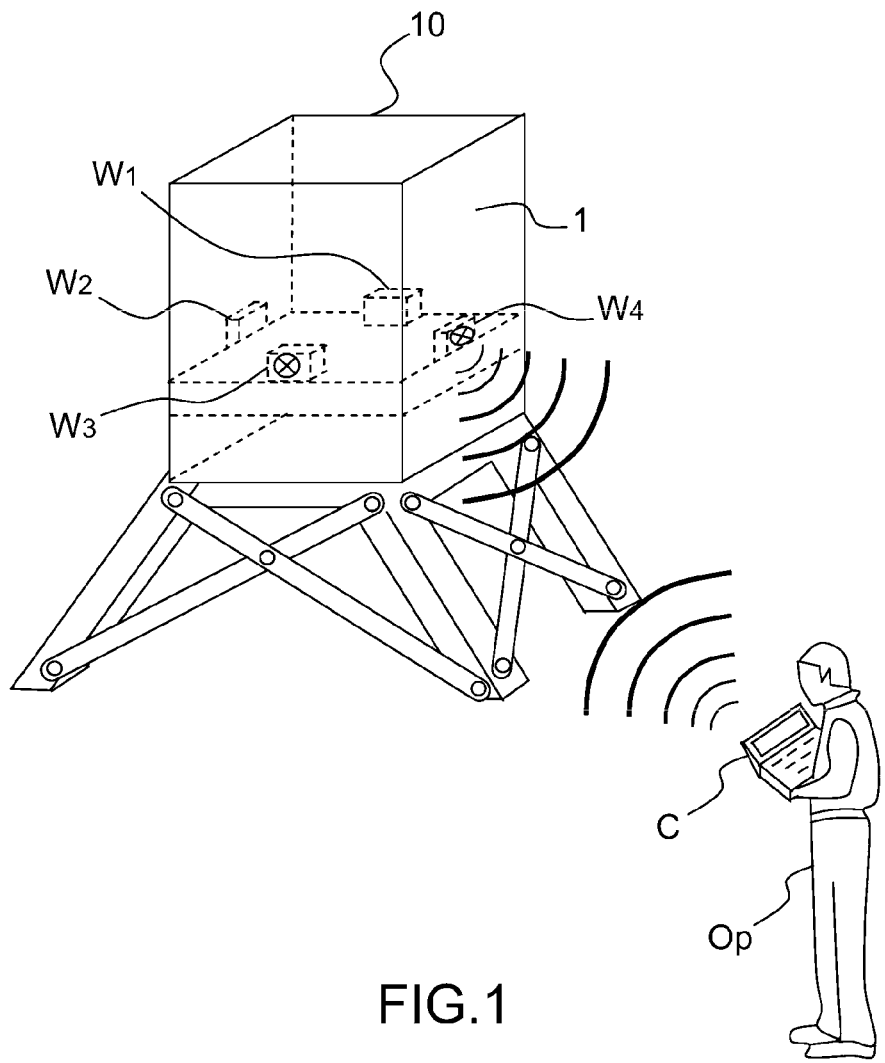
FIG. 1: an example of a satellite on the ground including input ports for smart couplers provided with wireless communication blocks for communication with the outside world, according to the invention.

FIG. 1 shows an example of a satellite 1, which may be in the assembly or testing phase on the ground, and comprising wireless communication blocks W1, W2, W3, W4 associated with smart couplers allowing for a non-intrusive exchange of information, that is to say, without dismantling any equipment and without disturbing the overall system, between said satellite 1 and an operator Op equipped with a computer C, which itself has a wireless communication card of WPAN (Wireless Personal Area Network) type for example. The wireless communication blocks W1, W2, W3, W4 generally mainly consist of a miniature radiofrequency antenna, as is described in FIG. 2. Moreover, the computer C of the operator Op is preferably a laptop computer.

The smart couplers, generally situated at the core of the satellite 1, within the various space equipment items, consist of the following elements:
- a processor associated with a storage unit, or internal memory;
- a transmission/reception circuit;
- a radiofrequency antenna.

The computer C includes a software program that can access the embedded wireless network via the wireless communication card, and that makes it possible to fulfill at least one of the following functions, as seen previously:
- assisting in determining the state of each of said space equipment items,
- updating, each of said space equipment items having an acceptance test report, said acceptance test reports,
- acquiring and recording failures, alarms or events occurring on said space equipment items,
- launching self-test procedures remotely on said space equipment items,
- reading technical data relating to said space equipment items,
- reading parameters relating to said space equipment items, recorded automatically,
- acquiring in real time parameters over one or more data buses associated with said space equipment items,
- providing diagnostic assistance in case of malfunction of one of the space equipment items on the ground,
- providing diagnostic assistance in case of malfunction of one of the space equipment items in flight.

The embedded wireless network, in the system according to the invention, is designed to be as unintrusive as possible.

In use on the ground, it can be deactivated electrically at any time. Furthermore, it acts only in data exchange mode with the data bus associated with the equipment item to which said coupler is connected. Finally, the embedded wireless network can be configured so that it can act only in data acquisition mode, the data being read from said data bus.

In flight, the system according to the invention, in particular the embedded wireless network, is preferably deactivated. However, if necessary, it can be configured so that it can be activated remotely by using the communication links of the satellite. The activation of the embedded wireless network can be limited according to the desired level of observability.

An operator Op can then, via a computer C equipped with wireless communication means and a suitable software program, connect to said embedded wireless network in order to access data recorded in the memory of the smart couplers associated with the equipment items of the satellite 1, or read data directly on the data buses of the satellite 1. Optionally, the embedded wireless network can, if necessary, handle the operational data bus function, active or redundant.

Figure 3:
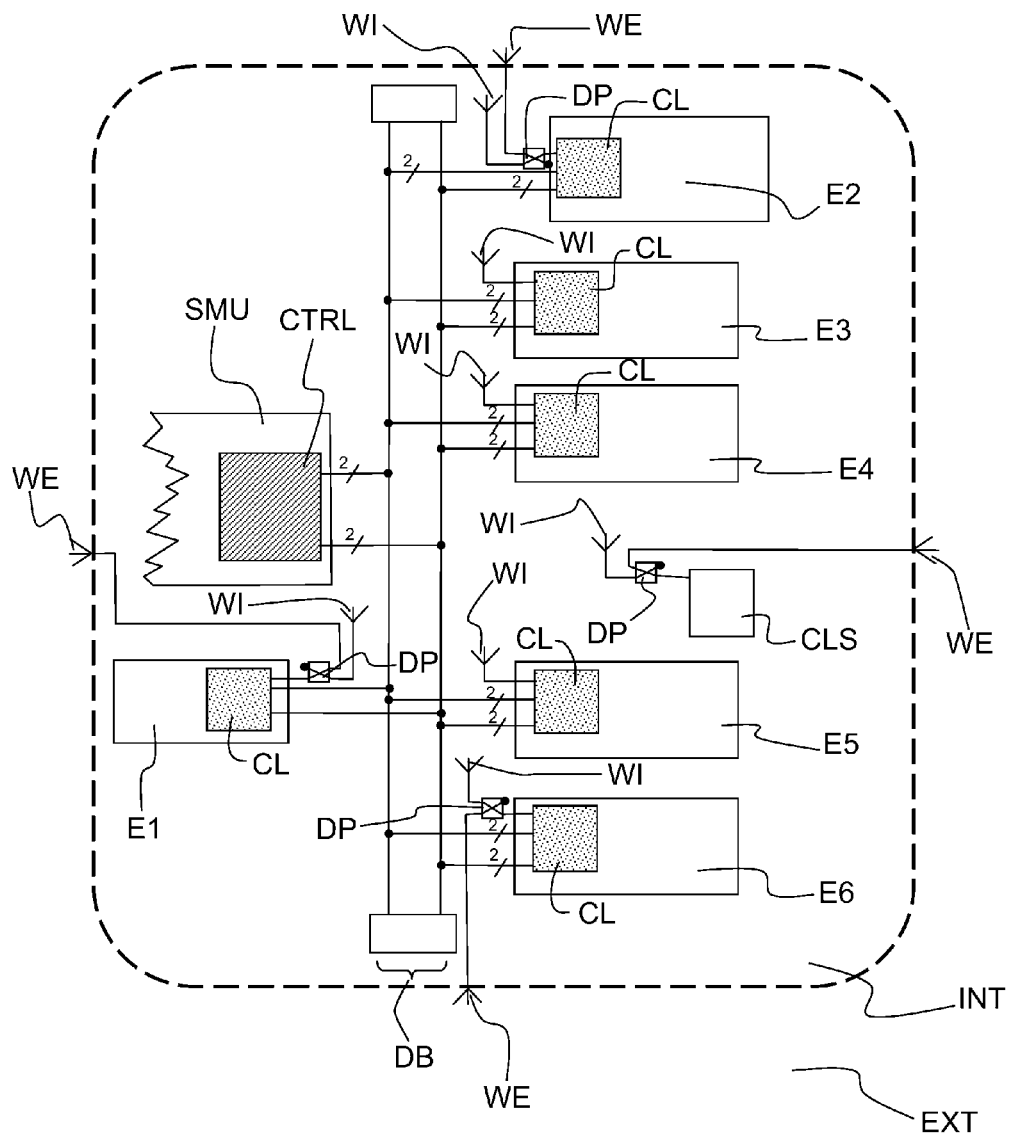
FIG. 3: the diagram of an example of implementation of an embedded wireless network according to the invention.

As mentioned above, the main function of the system according to the invention is to assist in producing a diagnosis, that is to say, assist in determining the causes of an anomaly. This activity is commonly referred to as "troubleshooting". In this context, the system according to the invention enables the operator Op to read data, either directly on a data bus, or in the internal memory of the smart couplers. Many parameters can thus be consulted, either by direct access, or because they have been stored. It is in fact possible to continuously record in the internal memory of the couplers parameters such as the frequency of an internal clock for example, that is to say parameters that are not necessarily linked to the function of the equipment item presenting an anomaly on which the operator Op is conducting an analysis. The objective is to make it possible to access what the equipment presenting an anomaly "has seen" as close as possible to the appearance of said anomaly. In FIG. 1, four wireless communication blocks W1 to W situated at the interface between the interior and the exterior of the satellite 1 are represented. According to the invention, smart couplers associated notably with these wireless communication blocks, said smart couplers not being represented in FIG. 1 but diagrammatically represented in FIG. 3, are arranged at the core of the satellite 1, within the space equipment items. Thus, these integrated smart couplers can communicate with at least one of the wireless communication blocks W1 to W4, situated at the interface between the interior and the exterior of the satellite 1.

Then, depending on his or her position around the satellite, the operator Op equipped with the laptop computer C interrogates the embedded wireless network by a communication link passing through the best placed wireless communication block W1, W2, W3 or W4. In the nonlimiting example of FIG. 1, a wireless communication block has been positioned on each of the faces of the satellite 1 so that the embedded wireless network is accessible to the operator Op regardless of his or her position around the satellite 1. This configuration is, however, not mandatory: it is possible to have only a single wireless communication block W1 for example.

Figure 2:
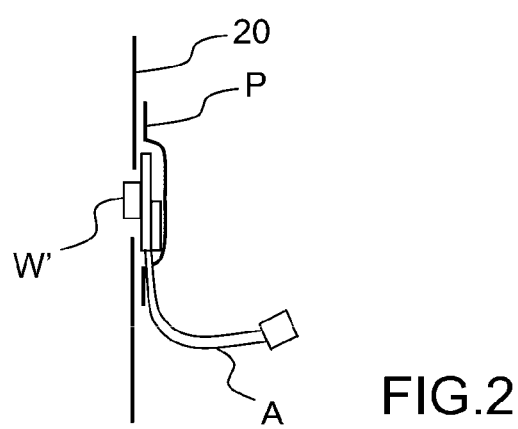
FIG. 2: the diagram of an example of means for fixing an input port for wireless communication means to the wall of a satellite.

FIG. 2 is a diagram showing an example of placement of a wireless communication block W', constituting an "air" input port on the adiabatic protection film 20 of a satellite 1. Said adiabatic protection film 20 of the satellite 1 is commonly called MLI (Multi-Layer Insulator); it provides a bilateral thermal insulation function. In this example, a pocket P of MLI film is added and sewn onto the adiabatic protection film 20 which covers the satellite 1. A wireless communication block W' is placed in said pocket P. The wireless communication block W' includes a miniature radiofrequency antenna A and constitutes a wireless communication means.

Said pocket P makes it possible, apart from the coaxial cable entry hole for the miniature radiofrequency antenna A, to retain the integrity of the thermal insulation.

FIG. 3 schematically represents an example of a system implementing the invention. The "internal world" INT, corresponding to the interior of a satellite, comprises a certain number of equipment items E1, E2, E3, E4, E5, E6, in which smart couplers CL are integrated.

Figure 4:
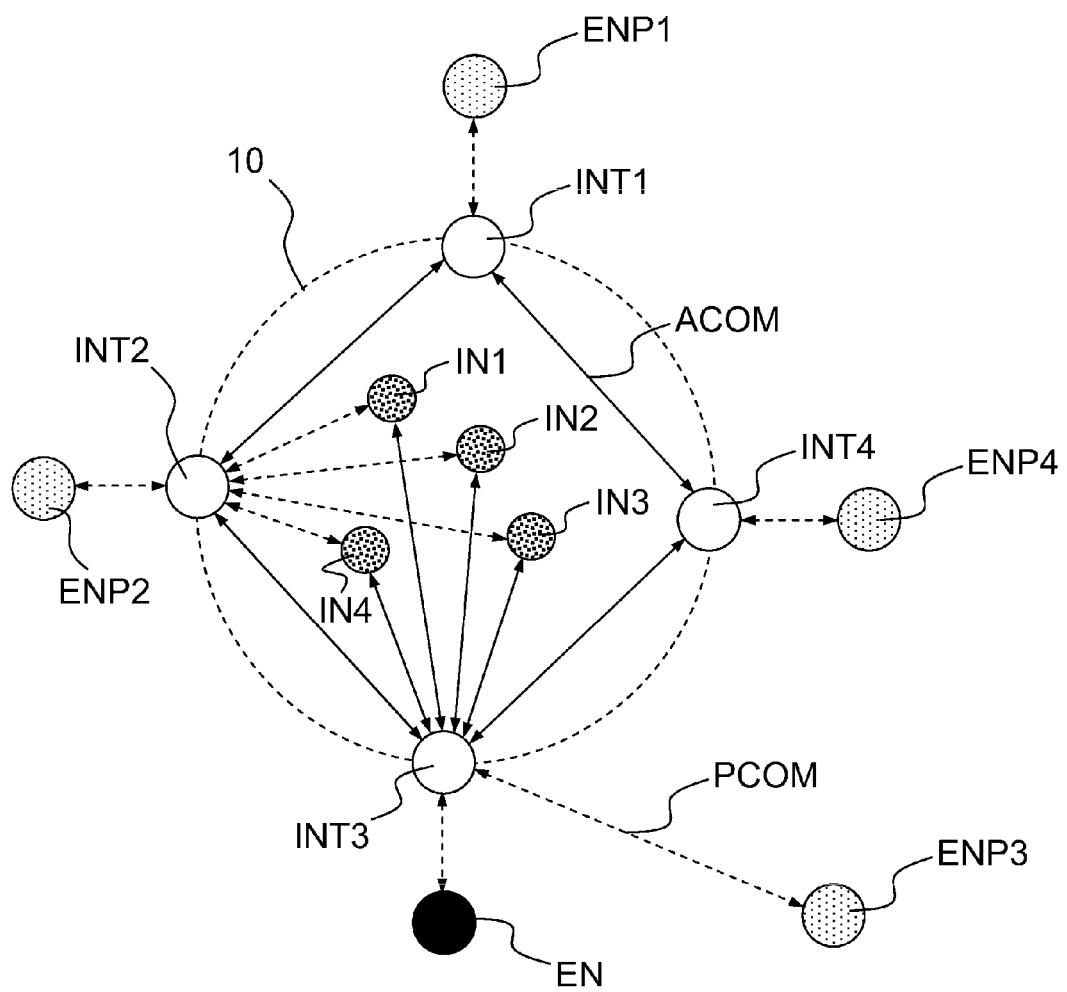
FIG. 4: the diagram of an example of "network topology" of a system according to the invention.

Furthermore, the equipment items E1, E2, E6, which are in immediate proximity to the walls of the satellite, are respectively associated with the communication nodes INT1, INT2, INT3 of FIG. 4. Said equipment items E1, E2, E6 are associated with an external wireless communication block WE and with an internal wireless communication block WI, coupled using a passive divider DP. In as much as any wall of the satellite would not be served by an equipment item, a single smart coupler CLS provided with said antennas WE and WI can serve as communication node INT4 for said equipment items, as in FIG. 4.

As for any conventional satellite, the "internal world" INT of FIG. 3 also includes physical data buses DB allowing for the exchange of data between the different equipment items E1 to E6. Moreover, the system management unit SMU contains a data bus controller CTRL and supervises the operation of the satellite. Finally, the "internal world" INT, via the wireless communication blocks WI, WE, enables a user belonging to the "external world" EXT to access the data bus DB and the equipment items E1 to E6 via the smart couplers CL or CLS. Said smart couplers CL or CLS are in effect respectively connected to at least one of the equipment items E1 to E6 and are designed to exchange information, in input and/or output mode, with said equipment items E1 to E6. The invention lies in particular in the fact that the smart couplers CL or CLS are associated with, or include, wireless communication means or blocks WE and WI. These wireless communication means WE, WI may be of Zigbee or Wifi type. It is also possible for some, for example the wireless communication blocks WI of the "internal world" INT to be of Zigbee type whereas the wireless communication blocks WE, constituting a communication interface with the "external world" EXT, are of Wifi type. From the point of view of the "internal world" INT, the wireless communication blocks WI associated with the smart couplers CL or CLS form an embedded wireless network internal to the satellite. The association of the smart couplers CL or CLS with communication blocks WE enabling communication with the "external world" makes it possible for a user belonging to the "external world" to access the embedded wireless network internal to the satellite. As FIG. 4 shows, the creation of this embedded wireless network internal to the satellite, and accessible from the "external world", has two main technical effects: on the one hand, it constitutes a non-intrusive means of investigation in case of failure of any one of the equipment items E1 to E6; on the other hand, the embedded wireless network internal to the satellite constitutes an evanescent data bus which, as a last resort and in case of malfunction of the physical data buses DB, can be used as a data bus.

FIG. 4 presents an example of topology of a wireless communication network deriving from the implementation of the system according to the invention. Smart couplers associated with wireless communication blocks are arranged inside the chamber 10 of the satellite, in the equipment items themselves. These couplers placed at the core of the satellite, and associated with wireless communication blocks, constitute internal communication nodes IN1, IN2, IN3, IN4. Other couplers provided with wireless communication blocks are positioned in equipment items situated at the periphery of the chamber 10 of the satellite. They constitute communication nodes INT1, INT2, INT3, INT4 at the interface between the interior of the satellite, the "internal world" and the exterior of the satellite, the "external world". These interface communication nodes INT1 to INT4 are here distributed so that the embedded wireless network is accessible over 360° around the satellite. In this way, potential external communication nodes ENP1, ENP2, ENP3, ENP4, mobile or stationary, can access the embedded wireless network. Thus, the communication links of the PCOM type in FIG. 4 indicates a potential communication link. In the example represented, the operator equipped with his or her computer provided with a wireless communication card constitutes an active external communication node EN. Thus, the communication links of the ACOM type in FIG. 4 represent active communication links.

As FIG. 4 shows, it is possible for an operator, via the external communication node EN, or via another potential external communication node ENP1 to ENP4, to access the embedded wireless network of the satellite. He or she can use the interface communication node INT3 situated at the interface between the interior and the exterior of the satellite. This communication node INT3 corresponds to one of the wireless communication blocks WE of FIG. 3; it is associated with one of the smart couplers CL. Said interface communication node INT3 uses the embedded wireless network to access the internal communication nodes IN1 to IN4. These internal communication nodes IN1 to IN4 correspond to the internal communication blocks WI of the "internal world" INT associated with the smart couplers CL, close to the equipment items E1 to E6, in FIG. 3. Via these internal communication nodes IN1 to IN4, the operator therefore accesses all the data that he or she needs, either by reading recorded parameters, automatically or by programming, in the internal memory of the smart couplers with which the satellite is equipped, or by reading technical data stored in the internal memory of said smart couplers, or by the acquisition of parameters directly over the real data buses, DB in FIG. 3, of the satellite. In this way, the operator can also remotely execute self-test functions on the equipment items, in order to assist in creating a diagnosis in case of anomaly.

As explained previously, this troubleshooting function, non-intrusive since it notably does not require any dismantling of equipment or any introduction of measuring instruments, can in all cases be very useful on the ground, in the assembly phase of a satellite or in the test phase. In practice, since all the subassemblies, all the equipment items have been rendered "communicating", by the integration of smart couplers provided with wireless communication means, from the time of their manufacture, it is possible to construct a permanent embedded wireless network, operational throughout the life of the satellite. By recording parameters or test results in the internal memory of the smart couplers introduced into the core of the satellite, it is also possible to enrich the technical data and the parameters available as and when interventions are made. In flight, the operator equipped with his or her laptop computer can, if necessary, access, via the communication means specific to the satellite, the previously activated embedded wireless network; this may constitute a final and precious aid to diagnosis in case of anomaly.

Finally, as seen previously, the embedded wireless network can, if necessary, be used as a data bus in case of failure of the physical data buses.

To sum up, the invention proposes placing an embedded wireless network inside a satellite via smart couplers provided with wireless communication means. The wireless communication mode used may preferably rely on the Zigbee/IEEE 802.15.4 protocol. However, other wireless communication protocols, Wifi for example, could also be used. This embedded wireless network constitutes an internal and barely intrusive evanescent data bus. An external operator equipped with a laptop computer provided with a wireless communication card and a suitable software program can access this embedded wireless network in order to acquire technical data relating to the integrated space equipment items. This may be particularly useful for the purposes of diagnostic assistance in case of anomaly, especially as it is also possible, via this link, to remotely execute self-test functions on the equipment items of the satellite. Furthermore, the internal evanescent data bus can constitute a real data bus used in parallel with a nominal or redundant operational data bus of the satellite.

Thus, three configurations are possible for the internal evanescent bus consisting of the embedded wireless network in the system according to the invention. It can be completely deactivated in flight. In this case, it is useful only on the ground, notably in the assembly and test phases. It can be deactivated in flight but able to be activated remotely. In this configuration, the embedded wireless network can be activated remotely in case of anomaly in order to assist in producing a diagnosis. Finally, it can be totally active throughout the flight of the satellite. It is then used as an operational data bus.

Finally, the non-intrusive accessibility to the embedded wireless network makes it possible to implement data bus monitoring functions, notably in the test or debugging phase.

It is, moreover, interesting to note that the use of an embedded wireless network as evanescent data bus offers the advantage of not requiring electric current to be carried, which may make it possible to simply resolve technical problems encountered in current satellites, associated with the galvanic insulation, such as, for example, primary ground and secondary ground problems.

The invention claimed is:

1. A communications system for space equipment items of a satellite, the system comprising:
a plurality of space equipment items coupled to operational data buses for data communication during a real operational mode of the satellite, each of the plurality of space equipment items comprising at least one smart coupler that comprises internal and external wireless communication means for internal and external satellite communication, a processor, an internal memory, a transmission/reception circuit, and at least one high-frequency antenna, said internal memory of said at least one smart coupler comprising means for at least one of the following functions:
automatically saving parameters relating to the operation of the space equipment item with which the at least one smart coupler is associated,
storing technical data relating to the space equipment item with which said at least one smart coupler is associated, and
storing self-test procedures relating to the space equipment item with which said at least one smart coupler is associated, the self-test procedures being configured to be executed remotely,
wherein said internal and external wireless communication means are configured to form an embedded wireless network having an evanescent data bus, and
wherein said evanescent data bus is configured to operate ground and onboard diagnostic functions of said plurality of space equipment items and to operate onboard data communication between said plurality of space equipment items.

2. The system according to claim 1, wherein said satellite comprises nominal ground/onboard communication means and is in flight, and wherein the embedded wireless network is configured to communicate with a computer situated on the ground via the nominal ground/onboard communication means.

3. The system according to claim 1, wherein said embedded wireless network comprises means for electrically activating and deactivating said embedded wireless network.

4. The system according to claim 3, wherein said embedded wireless network comprises means for remotely activating and deactivating said embedded wireless network, said plurality of space equipment items being on the ground when the satellite is in a test phase.

5. The system according to claim 3, wherein said embedded wireless network comprises means for remotely activating and deactivating said embedded wireless network, said plurality of space equipment items being in flight when the satellite is in orbit.

6. The system according to claim 1, further comprising means for at least one of the following functions:
   assisting in determining a state of each of said plurality of space equipment items;
   updating, for each of said plurality of space equipment items presenting an acceptance test report, said acceptance test report;
   acquiring and recording failures, alarms or events occurring on said plurality of space equipment items;
   launching self-test procedures remotely on said plurality of space equipment items;
   reading technical data relating to said plurality of space equipment items;
   reading parameters relating to said plurality of space equipment items that are recorded automatically;
   acquiring, in real time, parameters over one or more data buses associated with said plurality of space equipment items;
   providing diagnostic assistance in case of malfunction of one of the plurality of space equipment items on the ground; and
   providing diagnostic assistance in case of malfunction of one of the plurality of space equipment items in flight.

7. The system according to claim 1, wherein the embedded wireless network exhibits a topology comprising:
   internal nodes corresponding to the internal wireless communication means, and
   interface nodes corresponding to the external wireless communication means, wherein:
      said internal nodes and said interface nodes are associated with the internal and external smart couplers, and
      said interface nodes enable communication between said internal nodes and at least one external node that is fixed or mobile relative to said internal nodes, said at least one external node corresponding to a computer.

8. The system according to claim 1, wherein the embedded wireless network has a mode of operation in which the evanescent data bus cannot be activated in flight.

9. The system according to claim 1, wherein the embedded wireless network comprises an operational data bus configured to operate the satellite or redundantly operate the satellite.

10. The system according to claim 1, wherein the evanescent data bus comprises means for activating the evanescent data bus in flight for diagnostic assistance in case of malfunction of one of the plurality of space equipment items.

11. The system according to claim 1, wherein the embedded wireless network comprises a real data bus configured to operate the satellite or redundantly operate the satellite.

12. The system according to claim 1, further comprising at least one computer comprising a wireless communication card that is connected to said embedded wireless network, the computer storing at least one software program that, when executed by the computer, causes the computer to:
   restrict access to at least one of the plurality of space equipment items to collect information relating to correct operation of said at least one space equipment item; and
   access the embedded wireless network to collect information relating to operation of said plurality of space equipment items in a non-intrusive manner.

* * * * *